Dec. 5, 1961   W. D. BLOGOSLAWSKI   3,011,320
DEVICE FOR COOLING THE INTERIOR OF AN AUTOMOBILE
Filed Aug. 19, 1960
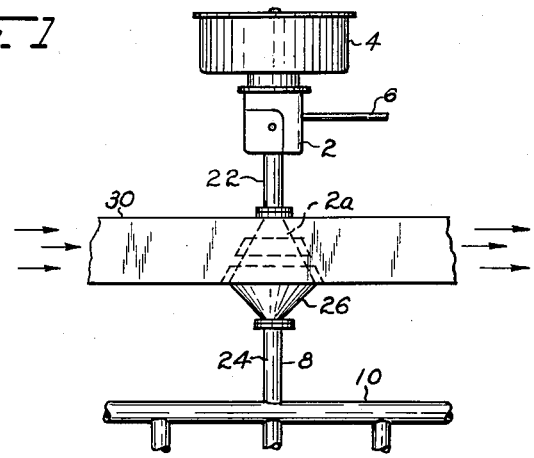
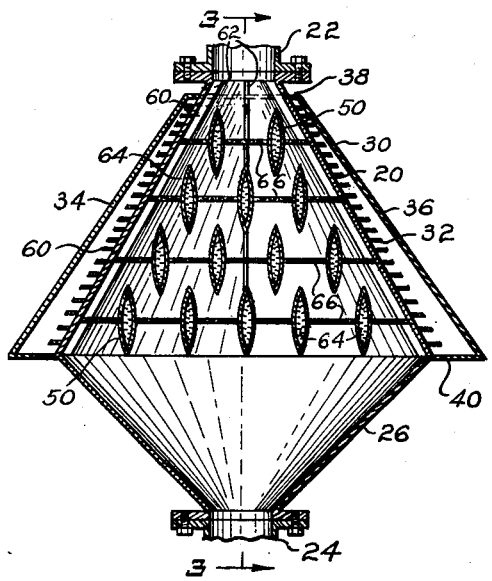
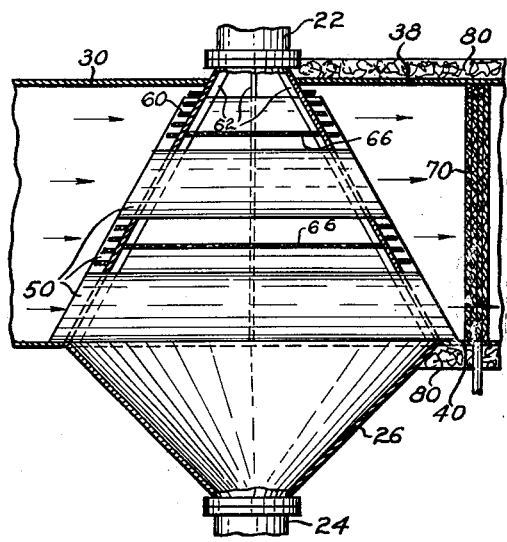
INVENTOR
WALTER D. BLOGOSLAWSKI
BY *Scrivener & Parker*
ATTORNEYS

United States Patent Office 3,011,320
Patented Dec. 5, 1961

3,011,320
DEVICE FOR COOLING THE INTERIOR OF AN AUTOMOBILE
Walter D. Blogoslawski, 125 Broad St., New Britain, Conn.
Filed Aug. 19, 1960, Ser. No. 50,719
4 Claims. (Cl. 62—7)

This invention relates broadly to air cooling systems and devices and more particularly, to such systems and devices for supplying cooled air to the interior of a motor vehicle, such as an automobile, which is powered by an internal combustion engine including a carburetor.

At the present time it is well known to interiorly air condition automobile vehicles, and many devices and systems are known for accomplishing this, and these known devices and systems are, in general, of two types. The first of such types is a built-in system which essentially forms an integral part of the vehicle and its power plant. Such built-in systems are very expensive and, in general, may only be incorporated into the automobile at the time of its construction. The second type of cooling means is a movable unit, very much like an ordinary window type air cooler, which is placed within the automobile. While air coolers of this latter type provide satisfactory air conditioning they have the very great disadvantage of taking up needed space within the automobile.

My invention provides means for cooling the air within an automobile by means which are not subject to the disadvantages of presently known systems, such as the disadvantages described above, and which can be used with, or applied to, any automotive vehicle which is operated by a power plant including a device, such as a carburetor, which supplies a gaseous air and fuel mixture to the cylinders of an internal combustion engine. An important aspect and feature of the invention is that it provides an inexpensive means for cooling the interior of an automobile, which may be easily installed and removed, which has no moving parts, and which may be added to any existing automobile without extensive or expensive alteration thereof.

The invention is described in the following specification and is illustrated in the accompanying drawing, in which:

FIG. 1 is a schematic view showing my invention applied to and associated with parts of an internal combustion engine which is the power plant for an automobile;

FIG. 2 is an enlarged view of parts shown in FIG. 1 and particularly illustrating the invention, and FIG. 3 is a cross-sectional view taken on line 3—3 of FIG. 2.

This invention provides a means for cooling air, such as that supplied to the interior of an automobile or any other vehicle which is operated by an internal combustion engine or other power plant in which a device, such as a carburetor, supplies a gaseous air and fuel mixture to the cylinders of the power plant. Parts of such a power plant are illustrated in FIG. 1 of the drawings and comprise a carburetor 2 which is supplied with air through a filter 4, and with liquid fuel through a pipe 6. The operation of such a carburetor is well known and need not be described further here, except to say that the carburetor supplies a gaseous mixture of air and fuel through a pipe designated generally at 8, to an intake manifold 10, from which the mixture is distributed to the cylinders of the power plant, which is not shown in the drawings.

Means are provided by this invention for causing a drop or reduction in the temperature of the gaseous mixture of air and fuel at a point between the carburetor 2 and the intake manifold 10, and for utilizing this drop in temperature for cooling air which is supplied to the interior of the vehicle. Such means comprise a hollow, frusto-conical member 20 which is interposed to the pipe 8 which leads from the carburetor to the intake manifold and which thus provides a chamber through which the gaseous mixture flows from the upper section 22 to the lower section 24 of the pipe 8. The smaller, upper end of this member 20 is connected to the upper pipe section 22 and is therefore closest to the carburetor 2. The larger, lower end of the member 20 is connected to the lower pipe section 24 through a hollow, frusto-conical member 26 which is inverted with respect to the frusto-conical member 20 and the lower, smaller end of which is connected to the lower pipe section 24. It will be seen that the gaseous air and fuel mixture produced and supplied by the carburetor 2 will pass from the carburetor into the upper pipe section 22, then into the chamber within the frusto-conical member 20 where it will expand, then into the hollow frusto-conical member 26 where its volume will be reduced, then into the lower pipe section 24, and finally into the intake manifold 10 from which it will be distributed to the engine cylinders.

It will be observed and apparent that the gaseous air and fuel mixture passing into the chamber within the frusto-conical member 20 will expand within that chamber and will then pass into the second chamber within the inverted frusto-conical member 26 where it will be compressed and passed into the lower pipe section 24. Further, the gasoline in the gaseous air and fuel mixture will evaporate in expanding within the section 20. In accordance with known physical principles, the gaseous mixture will therefore experience a drop in temperature within the frusto-conical member 20, due to expansion and evaporative cooling, and this temperature drop is utilized to cool air passing into the interior of the vehicle. In accordance with the invention this is done by positioning the frusto-conical member 20 within a hollow duct 30 which conducts air from any source, such as the exterior of the vehicle, to the interior thereof. This duct is shaped as a trapezoid in cross section and has side walls 34, 36, an upper wall 38 and a lower wall 40, and is somewhat wider than the frusto-conical member 20. The duct is given this size and cross sectional shape in order to provide a passage 32 between the outer wall of the member 20 and the inner wall of the duct 30, so that air passing through the duct and through passage 32 will come into close heat exchanging contact with the member 20. The duct is of such height that it does not cover any part of the lower, inverted frusto-conical member 26. Thus, the duct 30 provides a passage leading from any source of air, such as the exterior of the automobile, to the interior thereof, which passage is wider than the frusto-conical member 20, at least at the point or area where the frusto-conical member passes through the duct 30.

In order to increase the area of heat exchange contact between the air passing through the duct 30 and the cooled gaseous mixture within the frusto-conical member 20, a plurality of open ended tubes 50, each having relatively small cross sectional area, may be passed entirely through the frusto-conical member 20 in axial alignment with the duct 30. Part of the air passing through duct 30 will enter and pass through these tubes 50 as well as through the passage 32 between the members 20 and 30, thereby increasing the cooling effect of the expanding gaseous mixture within the frusto-conical member 20 on the air passing through the duct.

Various means may be provided by the invention for increasing and directing the flow of air and of gaseous air and fuel mixture from the carburetor to the intake manifold, through the duct 30 and through the tubes 50. As shown in FIG. 2, vertically spaced horizontal fins 60 may be mounted on the outer surface of the frusto-conical member 20 to increase and direct the flow of air through the duct 30 and to increase the area of cooling surface with which the air comes in contact in passing through the duct 30. In addition, spaced vertical fins 62 may be attached to the inner surface of the frusto-conical member 20 in order to direct and increase the flow of gaseous air and fuel mixture through the frusto-conical member. In addition, fins 64 may be attached to the inner surface of each of the tubes 50 and extend longitudinally thereof to direct the flow of air passing through the tubes and to increase the cooling surface with which the air flowing through the tubes comes into contact. In addition, fine screening 66 may be positioned within the frusto-conical member between adjacent tubes 50 which are at the same level. This screening will present the passage of any solids from the carburetor to the intake manifold. A water separator 70 may be positioned within the duct 30 on the output side of the frusto-conical member 20, as shown in FIG. 3, for the purpose of removing any water from the cooled air flowing through the duct and to insure that the cooled air reaching the interior of the automobile will be substantially perfectly dry. In order to prevent any heating of the cooled air within the duct 30 on the outlet side of the frusto-conical member 20 the duct 30 may be insulated as shown at 80 in FIG. 3.

I have found that an internal combustion engine equipped with an air cooling means according to my invention will have an increased operating efficiency which will be due to improved efficiency of combustion within the engine cylinders. This will be caused by a more complete vaporization of the gasoline particles, not only by reason of the screening 66 through which the gaseous air and fuel mixture must pass, but also because of the fact that the mixture is caused to travel a greater distance between the carburetor and the in-take manifold and will therefore achieve greater vaporization. Thus, while fuel economy is not a primary object of this invention, it is an important result of its use.

It is believed that the operation of the invention to provide cooling air to the interior of a vehicle will be apparent from the foregoing description. Air from any source, such as the exterior of the vehicle, will pass into, or may be forced into, the intake end of duct 30. The air will pass through this duct until it encounters the frusto-conical member 20 which forms part of the passage between the carburetor 2 and the intake manifold 10. The gaseous air and fuel mixture flowing from the carburetor to the manifold will expand within the member 20 and its temperature will therefore drop, thereby cooling the frusto-conical member 20 and the tubes 50 which pass through it. The air passing through duct 30 will flow around the frusto-conical member 20 and through the tubes 50 and will therefore be cooled and this cooled air will pass into the interior of the vehicle.

While the invention is described in this specification as applied to the cooling of air supplied to the interior of a vehicle powered by an internal combustion engine, it will be apparent that it will be useful in cooling air passing through any duct where there is available a source of gaseous fuel which is being supplied to a power plant.

While I have described and illustrated one form which my invention may take, it will be apparent to those skilled in the art that other embodiments, as well as modifications of that disclosed, may be made and practiced without departing in any way from the spirit or scope of the invention, for the limits of which reference must be made to the appended claims.

What is claimed is:

1. Air cooling apparatus, comprising a duct for air to be cooled, a source of gaseous fuel, a passage for conducting the gaseous fuel from the source to a power plant, an enclosed hollow chamber forming part of said passage and being positioned within said duct and being so constructed and arranged that it permits the passage of air through said duct, said chamber being of progressively increasing size from its inlet end adjacent the source of gaseous fuel to its outlet end adjacent the power plant whereby gaseous fuel passing through it will expand and drop in temperature, thereby cooling the air passing through the duct.

2. Air cooling apparatus, comprising a duct for air to be cooled, a source of gaseous fuel, a passage for conducting the gaseous fuel from the source to a power plant, an enclosed hollow chamber forming part of said passage and being positioned within said duct and being smaller in cross sectional size than the duct whereby it permits the passage of air through said duct, said chamber being of progressively increasing size from its inlet end adjacent the source of gaseous fuel to its outlet end adjacent the power plant whereby gaseous fuel passing through it will expand and drop in temperature, thereby cooling the air passing through the duct.

3. Air cooling apparatus, comprising a duct for air to be cooled, a source of gaseous fuel, a passage for conducting the gaseous fuel from the source to a power plant, an enclosed hollow chamber forming part of said passage and being positioned within said duct and being smaller in cross sectional size than the duct whereby it permits the passage of air through said duct, said chamber being of progressively increasing size from its inlet end adjacent the source of gaseous fuel to its outlet end adjacent the power plant whereby gaseous fuel passing through it will expand and drop in temperature, thereby cooling the air passing through the duct and a plurality of open ended tubes passing entirely through said chamber in alignment with said duct for passing air through said duct and chamber.

4. Means for supplying cooled air to the interior of a vehicle powered by an engine having a device which supplies a gaseous fuel to cylinders through a passage, comprising a duct for conducting air to the interior of the vehicle, and means for cooling the air passing through said duct, said means comprising a chamber forming part of the passage through which the gaseous fuel is supplied to the manifold and being progressively increasing size from its inlet end adjacent the source of gaseous fuel to its outlet end adjacent the intake manifold, whereby gaseous fuel expands as it passes through said chamber with consequent drop in temperature, said chamber being positioned within said duct and being so constructed that it permits the passage of air through the duct while cooling the air.

References Cited in the file of this patent

UNITED STATES PATENTS

| | | |
|---|---|---|
| 2,224,740 | Melcher | Dec. 10, 1940 |
| 2,227,927 | Downs | Jan. 7, 1941 |
| 2,311,512 | Backstrom | Feb. 16, 1943 |
| 2,359,219 | Jones | Sept. 26, 1944 |
| 2,579,512 | Perrine | Dec. 25, 1951 |

UNITED STATES PATENT OFFICE
CERTIFICATE OF CORRECTION

Patent No. 3,011,320                          December 5, 1961

Walter D. Blogoslawski

It is hereby certified that error appears in the above numbered patent requiring correction and that the said Letters Patent should read as corrected below.

Column 3, line 21, for "present" read -- prevent --.

Signed and sealed this 1st day of May 1962.

(SEAL)
Attest:

ERNEST W. SWIDER                                DAVID L. LADD
Attesting Officer                                    Commissioner of Patents